United States Patent
Foote et al.

(10) Patent No.: US 12,118,613 B2
(45) Date of Patent: Oct. 15, 2024

(54) SYSTEM AND METHOD FOR TRANSFERRING CURRENCY USING BLOCKCHAIN

(71) Applicant: HUMBL, INC., San Diego, CA (US)

(72) Inventors: Brian McLaren Foote, Del Mar, CA (US); Adam Wolfe, Sherman Oaks, CA (US); Jeff Hinshaw, San Diego, CA (US)

(73) Assignee: HUMBL, INC., San Diego, CA (US)

( * ) Notice: Subject to any disclaimer, the term of this patent is extended or adjusted under 35 U.S.C. 154(b) by 32 days.

(21) Appl. No.: 17/143,002

(22) Filed: Jan. 6, 2021

(65) Prior Publication Data

US 2021/0209684 A1 Jul. 8, 2021

Related U.S. Application Data

(60) Provisional application No. 62/958,193, filed on Jan. 7, 2020.

(51) Int. Cl.
*G06Q 40/04* (2012.01)
*G06F 16/27* (2019.01)
(Continued)

(52) U.S. Cl.
CPC ............. *G06Q 40/04* (2013.01); *G06F 16/27* (2019.01); *G06F 21/602* (2013.01);
(Continued)

(58) Field of Classification Search
CPC ........ G06Q 20/06; G06Q 20/02; G06Q 40/04; G06Q 20/0655
See application file for complete search history.

(56) References Cited

U.S. PATENT DOCUMENTS 7,899,744 B2 * 3/2011 Bishop ................... G06Q 20/40
705/38
7,925,586 B2 * 4/2011 Cole ..................... G06Q 20/023
705/40
(Continued)

FOREIGN PATENT DOCUMENTS

CN 110709878 A * 1/2020 ............. G06Q 20/02

OTHER PUBLICATIONS

"A guide to Pancakeswap" Binance Academy (https://academy.binance.com/en/articles/a-guide-to-pancakeswap) (Year: 2020).*
(Continued)

*Primary Examiner* — Daniel S Felten
(74) *Attorney, Agent, or Firm* — ROEDER & BRODER LLP; James P. Broder; Devin R. Vaage

(57) ABSTRACT

A financial services system that utilizes a user device and a blockchain having a blockchain ledger includes. a host database having a non-transitory computer-readable medium including code and a host controller that executes the code. The host controller enables communication between a first digital wallet on the user device and one of a local currency account and a digital currency account to initiate a deposit via one of the currency accounts. The deposit can be assigned a transaction ID that is recorded to the blockchain ledger. The transaction ID can include a deposit currency value. A method for transferring currency includes the steps of enabling communication between a first digital wallet on a user device and one of a local currency account and a digital currency account with a host controller of a host database to initiate a deposit via one of the currency accounts, assigning a transaction ID to the deposit, and recording the transaction ID that includes a deposit currency value to a blockchain ledger.

18 Claims, 5 Drawing Sheets

(51) Int. Cl.
  *G06F 21/60* (2013.01)
  *G06Q 10/10* (2023.01)
  *G06Q 20/06* (2012.01)
  *G06Q 20/36* (2012.01)
  *G06Q 20/38* (2012.01)
  *G06Q 40/02* (2023.01)
  *H04L 9/08* (2006.01)

(52) U.S. Cl.
  CPC ..... *G06Q 20/0655* (2013.01); *G06Q 20/3676* (2013.01); *G06Q 20/3678* (2013.01); *G06Q 20/381* (2013.01); *G06Q 20/3829* (2013.01); *G06Q 20/389* (2013.01); *G06Q 40/02* (2013.01); *H04L 9/0894* (2013.01); *G06Q 10/10* (2013.01); *G06Q 2220/00* (2013.01)

(56) References Cited

U.S. PATENT DOCUMENTS

| | | | | |
|---|---|---|---|---|
| 7,941,367 | B2* | 5/2011 | Bishop | G06Q 40/03 705/40 |
| 7,941,372 | B2* | 5/2011 | Bishop | G06Q 20/10 705/40 |
| 9,419,951 | B1* | 8/2016 | Felsher | H04L 9/0841 |
| 10,068,228 | B1* | 9/2018 | Winklevoss | H04L 9/085 |
| 10,832,247 | B2 | 11/2020 | Durvasula et al. | |
| 11,507,929 | B2* | 11/2022 | Hurry | H04L 9/0897 |
| 2009/0048887 | A1* | 2/2009 | Bishop | G06Q 40/00 705/30 |
| 2015/0052010 | A1 | 2/2015 | Alba et al. | |
| 2015/0170112 | A1* | 6/2015 | DeCastro | G06Q 20/381 705/39 |
| 2017/0032365 | A1 | 2/2017 | Liberty et al. | |
| 2017/0372278 | A1* | 12/2017 | Frolov | G06Q 20/0655 |
| 2018/0121902 | A1* | 5/2018 | Maim | G06Q 20/3674 |
| 2018/0225639 | A1 | 8/2018 | Rosamilia | |
| 2019/0034888 | A1* | 1/2019 | Grassadonia | G06Q 20/20 |
| 2019/0228409 | A1* | 7/2019 | Madisetti | G06Q 40/03 |
| 2019/0325431 | A1 | 10/2019 | Mann | |
| 2019/0340586 | A1* | 11/2019 | Sheng | G06N 20/00 |
| 2020/0013045 | A1* | 1/2020 | Spalding | G06Q 20/02 |
| 2020/0151682 | A1 | 5/2020 | Hurry et al. | |
| 2021/0326844 | A1* | 10/2021 | Zhou | G06Q 20/06 |

OTHER PUBLICATIONS

"What is UNISWAP and How Does it Work?" Binance Academy (https://academy.binance.com/en/articles/what-is-uniswap-and-how (Year: 2020).*

International Search Report and Written Opinion, dated Mar. 30, 2021, in PCT International Application No. PCT/US/2021/012371, Applicant Brian McLaren Foote.

* cited by examiner

SYSTEM AND METHOD FOR TRANSFERRING CURRENCY USING BLOCKCHAIN

RELATED APPLICATION

This application claims priority on U.S. Provisional Application Ser. No. 62/958,193, filed on Jan. 7, 2020, and entitled "SYSTEM AND METHOD FOR TRANSFERRING CURRENCY USING BLOCKCHAIN." As far as permitted, the contents of U.S. Provisional Application Ser. No. 62/958,193 are incorporated in their entirety herein by reference.

BACKGROUND

Cross-border money transmission and remittance involve many complex issues. Traditionally, financial systems operate in closed systems, which makes global money transfer difficult. For example, regulatory compliance for such money transfers can be fairly complicated and somewhat convoluted. Conventional systems have attempted to address disparate financial technology use cases as one-off solutions. Such one-off solutions have included the same currency transfers, foreign exchange transfers, and remittance. There is a need for an amalgamation or convergence of these processes, and a simplification of end-to-end solutions for users.

SUMMARY

The present invention is directed toward a financial services system that can utilize a user device and a blockchain having a blockchain ledger. In various embodiments, the financial services system includes a host database including a non-transitory computer-readable medium including code and a host controller that executes the code. The host controller can enable communication between a first digital wallet on the user device and one of a local currency account and a digital currency account to initiate a deposit via one of the currency accounts. The deposit can be assigned a transaction ID that is recorded to the blockchain ledger. The transaction ID can include a deposit currency value.

In certain embodiments, the host controller can be configured to assign a balance equal to the deposit currency value to one of the currency account and the first digital wallet, the balance being verified by the blockchain ledger.

In various embodiments, the host controller can be configured to enable withdrawal of at least a portion of the balance.

In some embodiments, the host controller can be configured to send and store the deposit in a pool account.

In certain embodiments, the host controller can be configured to enable a withdrawal of a withdrawal amount equal to at least a portion of the balance from the pool account.

In various embodiments, the host controller can be configured to dynamically determine the withdrawal amount in any of a plurality of currencies using a foreign exchange rate pricing algorithm on the non-transitory computer-readable medium.

In some embodiments, the host controller can be configured to transfer the withdrawal amount to the first digital wallet.

In certain embodiments, the host controller can be configured to update the blockchain ledger to reflect the withdrawal amount.

In various embodiments, the host controller can be configured to execute a balance transfer from the first digital wallet to a second digital wallet that is different than the first digital wallet.

In some embodiments, the host controller can be configured to update the blockchain ledger to reflect the balance transfer from the first digital wallet to the second digital wallet.

The present invention is further directed toward a method for transferring currency. In certain embodiments, the method can include the steps of enabling communication between a first digital wallet on a user device and one of a local currency account and a digital currency account with a host controller of a host database to initiate a deposit via one of the currency accounts, assigning a transaction ID to the deposit, and recording the transaction ID that includes a deposit currency value to a blockchain ledger.

In various embodiments, the method can further include the steps of the host controller assigning a balance equal to the deposit currency value to one of (i) one of the currency accounts and (ii) the first digital wallet; and verifying the balance with the blockchain ledger.

In some embodiments, the method can further include the step of the host controller enabling withdrawal of at least a portion of the balance.

In certain embodiments, the method can further include the step of the host controller sending and storing the deposit in a pool account.

In various embodiments, the method can further include the step of the host controller enabling a withdrawal of a withdrawal amount equal to at least a portion of the balance from the pool account.

In some embodiments, the method can further include the step of the host controller dynamically determining the withdrawal amount in any of a plurality of currencies using a foreign exchange rate pricing algorithm.

In certain embodiments, the method can further include the step of the host controller transferring the withdrawal amount to the first digital wallet.

In various embodiments, the method can further include the step of the host controller updating the blockchain ledger to reflect the withdrawal amount.

In certain embodiments, the method can further include the step of the host controller executing a balance transfer from the first digital wallet to a second digital wallet that is different than the first digital wallet.

The present invention is also directed toward a financial services system for transferring currency using a blockchain having a blockchain ledger. The financial services system can include a host database including a non-transitory computer-readable medium including code and a host controller that executes the code. The host controller can enable communication between a first digital wallet on the user device and one of a local currency account and a digital currency account to initiate a deposit via one of the currency accounts. The deposit can be stored in a pool account and assigned a transaction ID that is recorded to the blockchain ledger. The transaction ID can include a deposit currency value. In certain embodiments, the host database can include (i) an encrypted partition configured to store encrypted user data using a cryptographic key, and (ii) an encrypted tunnel configured to protect and prevent unauthorized access to the financial services system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of systems and methods for facilitating improved currency transfer via a fully integrated financial services system including a blockchain. More specifically, by providing financial services on a hybrid blockchain system including updated mobile support, currency transfers can be faster, contactless, and work across multiple countries. These improved currency transfer systems can utilize mobile wallets and conventional bank accounts and the systems can be implemented by partner businesses. Benefits to the users of the improved currency transfer systems include lower rates (foreign currency exchange, loans, etc.), faster transfer speeds, reduced settlement times, mobile application access, elimination of wire transfers and bank-initiated transfers, and increased security.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming, but would nevertheless be a routine undertaking of engineering for those of ordinary skill in the art having the benefit of this disclosure.

Figure 1:
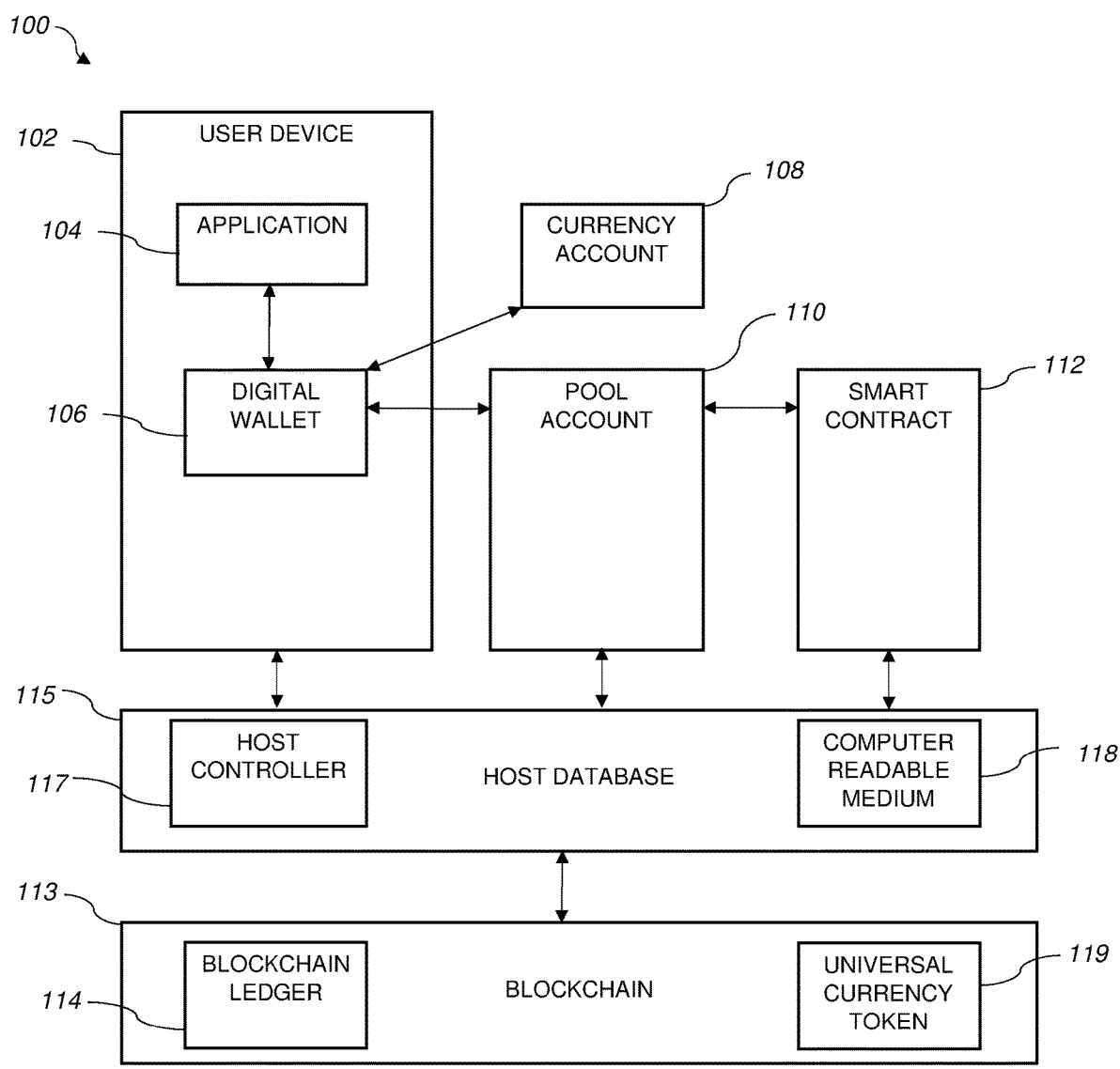
FIG. 1 is a block diagram depicting one embodiment of a financial services system utilizing blockchain technology.

FIG. 1 is a block diagram depicting one embodiment of a financial services system 100 utilizing blockchain technology. The financial services system 100 can be implemented on a host system that can communicate with a network of user devices. The host system can include a database. The financial services system 100 can vary depending on the design requirements of the financial services system 100. It is understood that the financial services system 100 and host system can include additional systems, subsystems, components, and elements than those specifically shown and/or described herein. Additionally, or alternatively, the financial services system 100 and host system can omit one or more of the systems, subsystems, and elements that are specifically shown and/or described herein.

In the embodiment illustrated in FIG. 1, the financial services system 100 can include a user device 102, an application 104, a digital wallet 106, a currency account 108, a pool account 110, a smart contract 112, a blockchain 113, a host database 115, a host controller 117 and a non-transitory computer-readable medium 118. The financial services system 100 can further include a blockchain ledger 114 and a universal currency token 119. Users and/or agents can access the financial services system 100 to utilize various services. In some embodiments, users can grant access to agents, including access to the users' sensitive user data.

Agents can receive access to sensitive data through a role-based access control permission system (RBAC) via an Agent Portal. The agent can receive funds and offer other cash remittance services to users, such as loans. In some instances, the agent will register a new user to the financial service system 100. After registering the new user, the agent can receive cash from the new user and deposit it into the user's newly created e-wallet using a point-of-sale interface. The agent can make transfers to recipients on behalf of the new user.

User device 102 can be configured to communicate via a network (not shown). The user device 102 can communicate with the host database 115 and the host controller 117 to perform processes over the network. The user device 102 can vary depending on the design requirements of the financial services system 100. It is understood that the user device 102 can include additional systems, subsystems, components, and elements than those specifically shown and/or described herein. Additionally, or alternatively, the user device 102 can omit one or more of the systems, subsystems, and elements that are specifically shown and/or described herein.

For example, the user devices 102 can include a computer or a user device processor, or a set of computers/processors, although other types of computing units or systems can be used. Exemplary user devices include servers, pooled servers, laptops, notebooks, handheld computers, personal digital assistants, cellular phones, smartphones (e.g., iPhone®, BlackBerry®, Android®, etc.) tablets, wearables (e.g., smartwatches and smart glasses), Internet of things (IoT) devices or any other device capable of receiving data over a network.

Each user device 102 can run one or more applications 104 to interact with the blockchain 113, communicate with other user devices 102, perform crypto operations, and otherwise operate within the financial services system 100. The user devices 102 can include any device capable of receiving and displaying an electronic message via the network and communicating with the blockchain 113. In certain embodiments, each user device 102 can include an encrypted partition configured to store encrypted user data using a cryptographic key, As used herein, the term "network" includes any cloud, cloud computing system, or electronic communications system or method that incorporates hardware and/or software components. Communication among the parties can be accomplished through any suitable communication channels, such as, for example, a telephone network, an extranet, an intranet, internet, point of interaction device (point of sale device, personal digital assistant, cellular phone, kiosk, tablet, etc.), online communications, satellite communications, off-line communications, wireless communications, transponder communications, local area network (LAN), wide area network (WAN), a virtual private network (VPN), networked or linked devices, keyboard, mouse and/or any suitable communication or data input modality.

Moreover, although the financial services system 100 is described herein as being implemented with TCP/IP communications protocols, the system can also be implemented using IPX, Appletalk, IP-6, NetBIOS, OSI, any tunneling protocol (e.g. IPsec, SSH), or any number of existing or future protocols. If the network is in the nature of a public network, such as the Internet, it can be advantageous to presume the network to be insecure and open to eavesdroppers.

A network can be unsecure. Thus, communication over the financial services system 100 can utilize data encryption. Encryption can be performed by way of any of the techniques now available in the art or which can become available—e.g., Twofish, RSA, El Gamal, Schorr signature, DSA, PGP, PKI, GPG (GnuPG), and symmetric and asymmetric cryptosystems, as non-exclusive examples. Asymmetric encryption in particular can be implemented for signing and verifying signatures for blockchain crypto operations.

The application 104 can be displayed on the user device 102 via a graphical user interface (not shown). The application 104 can vary depending on the design requirements of the financial services system 100, the user device 102, and the host database 115. It is understood that application 104 can include additional systems, subsystems, components, and elements than those specifically shown and/or described herein. Additionally, or alternatively, application 104 can omit one or more of the systems, subsystems, and elements that are specifically shown and/or described herein. The host database 115 including the host controller 117 can control all of the functionality of the application 104. As provided in greater detail herein, the application 104 communicates with the host database 115 to perform the functions identified herein.

Conventionally, blockchain systems, banks, and other financial service providers need a third party (not shown) to provide connectivity between the systems and providers. The application 104 can fully integrate the third-party connections utilized by the financial services system 100 and can provide connectivity between the disparate systems of the financial services system 100. The application 104 can streamline the usability of the financial services system 100, increasing the speed and the performance of currency transfers within the system.

The user interface (not shown) within the application 104 can include a mobile graphical user interface (not shown) that accommodates multiple currencies (international, national, digital, crypto, etc.), countries, and languages. The application 104 can make use of a dynamic back-end query layer that can be optimized using insights derived from artificial intelligence to make requests of the various service providers and the third parties. The application 104 can include a point-of-sale user interface. Additionally, the application 104 can include multiple third-party application program interfaces (APIs) to perform various application tasks. The application 104 can include a blockchain interface (not shown) for interacting with the blockchain 113.

Through the application 104, users can send money, request money, receive money, pay employees/independent contractors, scan a QR code to pay/tip, rate/review a merchant. The application 104 can include new user onboarding. The new user onboarding process can include reading and agreeing to the terms of service, entering the user's full name into the system, selecting the user's country where the system will be used, creating user credentials including a password and a username/handle, sending a two-factor authentication code to a phone number to confirm sign-up, and adding a phone number to the new user account. The application 104 enables users to send money in a manner similar to a text message to any user of the system from any country.

A number of social integration features (not shown) can be included in the application 104. The application 104 can include a user friend list where the user can add contacts and friends. Search requests can be entered on the application 104 to find friends who already use the system. Invites to new users can be sent via text message, email, or other electronic messaging services through the application 104. The application 104 can access the user device contact list to find suggested friends.

Payment methods can be added to the application 104 by the user. The user can set up a bank card to make payments and transfer received funds to the bank via the application 104. Any electronic or traditional payment methods known in the art can be added to the application 104. Application Programming Interfaces (APIs) can be used with third-party partners to integrate third-party payment methods. Users can transfer money to their bank account via the application 104.

Peer-to-peer (P2P) payments can be made through the application 104. The application 104 allows users to find other users and send currency to any user of the system. Upon receipt of currency, the application 104 will notify the user that they have received currency sent from another user. The user can select the type of currency and the amount of the currency they would like to send via the application 104. Users can add memos to the payments on the application 104. The application 104 can generate a favorites list for the most frequent recipients in order to enable a quick-send feature. The user can check the history of payments made or received on the application 104. Users can send currency instantly via peer-to-peer transfers by scanning a QR code (not shown) in the application 104 using the user device 102, regardless of whether the users are in the same physical location.

The application 104 can also provide features to service providers. Service providers can invite clients to use the system via the application 104. Service providers can also find clients who already use the system. Clients can pay the service providers and service providers can request payment via the application 104. Both parties can receive notifications of the transaction via the application 104. Service providers can check the history of their payments (including a batched payment history by date), transfer money to their banks, and add memos to payments in the application 104.

The user device 102 can include a digital wallet 106 that interacts with the various elements of the financial services system 100, including the application 104. The digital wallet 106 can vary depending on the design requirements of the financial services system 100, user device 102, and/or the application 104. It is understood that the digital wallet 106 can include additional systems, subsystems, components, and elements than those specifically shown and/or described herein. Additionally, or alternatively, the digital wallet 106 can omit one or more of the systems, subsystems, and elements that are specifically shown and/or described herein. As provided in greater detail herein, the digital wallet 106 communicates with the host database 115 to perform the functions identified herein.

For example, the digital wallet 106 can be connected to a currency account 108. The digital wallet 106 can be configured to transfer funds to the pool account 110. The digital wallet 106 can interact directly with the blockchain 113 or via a blockchain interface. In various embodiments, the digital wallet 106 can serve as an interface to the user. In that regard, the digital wallet 106 can run on the user device 102 as a thin web client, a hybrid app, or a native one. The digital wallet 106 can use a Hierarchical Deterministic (HD) Wallet solution and can use BIP32, BIP39, and/or BIP44 to generate an HD tree of public addresses. The digital wallet 106 can also be configured to interact with the blockchain 113 either via a Blockchain client, such as GETH, or via API calls using the blockchain 113 as a service provider, such as Microsoft Azure® or Blockapps STRATO, for example. The host database 115 including the host controller 117 can communicate with the digital wallet 106 over the network.

A currency account 108 can be associated with the digital wallet 106. The currency account 108 can be one or more accounts and can include a traditional bank account, a digital-only account, source accounts, destination accounts, escrow accounts, and digital currency accounts (e.g., Bitcoin). The currency account 108 can be configured to be accessible on the user device 102 via the application 104 and/or the digital wallet 106.

The currency account 108 can vary depending on the design requirements of the financial services system 100, user device 102, the application 104, and/or the digital wallet 106. It is understood that the currency account 108 can include additional systems, subsystems, components, and elements than those specifically shown and/or described herein. Additionally, or alternatively, the currency account 108 can omit one or more of the systems, subsystems, and elements that are specifically shown and/or described herein. As provided in greater detail herein, the currency account 108 communicates with the host database 115 to perform the functions identified herein.

A pool account 110 can be included in the financial services system 100. The pool account 110 can be owned and operated by the service provider controlling the financial service system 100. The pool account 110 can include one account or more than one account capable of holding any suitable form of currency. The pool account 110 can hold currencies including cash (domestic and foreign), digital currencies (cryptocurrency, digital account balances, etc.), notes, bonds, stocks, real property, and any other types of assets. The pool account 110 works in cooperation with the digital wallet 106 to receive funds from the digital wallet 106. Additionally, the pool account 110 can issue currencies to users via the executable smart contracts 112.

The pool account 110 can vary depending on the design requirements of the financial services system 100, the user device 102, the application 104, and/or the digital wallet 106. It is understood that the pool account 110 can include additional systems, subsystems, components, and elements than those specifically shown and/or described herein. Additionally, or alternatively, the pool account 110 can omit one or more of the systems, subsystems, and elements that are specifically shown and/or described herein. As provided in greater detail herein, the pool account 110 communicates with the host database 115 to perform the functions identified herein.

The smart contracts 112 can be used with the financial services system 100. The financial services system 100 can enable digital currency smart contracts 112 that enforce business workflows in a decentralized manner and keep track of account balances. The financial services system 100 can enable reputation based smart contracts 112 that act as a directory of trustworthy entities as part of the network. The digital wallet 106 can enable payments by interacting with the smart contracts 112 and the blockchain 113 underpinning the payment network. The transfers made within the financial services system 100 can be orchestrated using the smart contracts 112. The smart contracts 112 can reside on the blockchain 113, but also can exist external to the blockchain 113.

The digital currency smart contracts 112 can autonomously govern the workflow of the financial services system 100 by supporting execution and recording of various actions such as account registration, balance transfers, purchases, or other related actions. The digital currency smart contract 112 can control the end-to-end flow of the system. The digital currency smart contract 112 can be configured to maintain accounting for various user accounts by keeping a historic record of transactions and balances. The digital currency smart contract 112 can include a program written in a programming language such as, for example, Solidity, or any other suitable programming language. The smart contracts 112 can be completed by a digital signature using asymmetric crypto operations and a private key, for example.

The smart contracts 112 can vary depending on the design requirements of the financial services system 100, the user device 102, the application 104, the digital wallet 106, and/or the blockchain 113. It is understood that the smart contracts 112 can include additional systems, subsystems, components, and elements than those specifically shown and/or described herein. Additionally, or alternatively, the smart contracts 112 can omit one or more of the systems, subsystems, and elements that are specifically shown and/or described herein. As provided in greater detail herein, the smart contracts 112 communicates with the host database 115 to perform the functions identified herein.

The blockchain 113 can be used within the financial services system 100. The blockchain 113 is a distributed database that maintains records in a readable manner and that is also resistant to tampering and provides immutability. In the context of the financial services system 100, the blockchain 113 can serve as a digital ledger containing transactions conducted on the financial services system 100, including currency transfers.

The blockchain 113 can comprise a system of interconnected blocks containing data. The blockchain 113 can include one or more blockchains, and the blockchains can act in unison to function as a single blockchain 113. The blocks can hold transaction data, contract data, and/or other information as desired. Each block can link to the previous block and can include a timestamp. The blockchain 113 can be a peer-to-peer network that is private, consortium, and/or public in nature (e.g., Ethereum, Bitcoin, etc.). Consortium and private networks can offer improved control over the content of the blockchain 113 and public networks can leverage the cumulative computing power of the network to improve security.

The blockchain 113 can be based on blockchain technologies such as, for example, Ethereum, Open Chain, Chain Open Standard, etc. For a blockchain-based peer-to-peer payment network, a governing organization or consortium can control access to bank transfer services. Anyone can participate in the payment network, but in various embodiments, only users that registered with the managing organization(s) can transfer earned credits into currency via wire transfers to bank accounts. The blockchain 113 can autonomously manage workflows associated with payment processing as described in greater herein, reducing the processing load on the computer devices 102 within the system.

The application 104 can include a client library (not shown) or process used for interacting with the blockchain 113. The financial services system 100 can also include a wallet service configured to coordinate orchestration between the digital wallet 106 operating on the user device 102 and the external systems (e.g., the currency account 108, the pool account 110, etc.). For payment interactions, the digital wallet 106 running on the user device 102 can interact with the blockchain 113 directly using the application 104 on the user device 102.

The blockchain 113 can vary depending on the design requirements of the financial services system 100, the user device 102, the application 104, the digital wallet 106, and/or the smart contract 112. It is understood that the blockchain 113 can include additional systems, subsystems, components, and elements than those specifically shown and/or described herein. Additionally, or alternatively, the blockchain 113 can omit one or more of the systems, subsystems, and elements that are specifically shown and/or described herein. As provided in greater detail herein, the blockchain 113 communicates with the host database 115 to perform the functions identified herein.

The blockchain 113 can include a blockchain ledger 114 that is configured to execute payment transactions in response to blockchain requests. The blockchain ledger 114 can be based on the blockchain 113 and thus have consensus-based transaction validation and immutability. When implemented in support of a financial services system 100, the blockchain ledger 114 can serve as a ledger for transfers of funds, contracts, offers, and other suitable data retained in the blockchain 113.

The blockchain ledger 114 can record all transactions conducted within the financial services system 100. When implemented in support of the financial services system 100, the blockchain ledger 114 can serve as a ledger for transfers of funds, contracts (including smart contracts 112), offers, loans, liens, and other suitable data retained in the blockchain 113. The blockchain ledger 114 can vary depending on the design requirements of the financial services system 100, the user device 102, the application 104, the digital wallet 106, and/or the blockchain 113. It is understood that the blockchain ledger 114 can include additional systems, subsystems, components, and elements than those specifically shown and/or described herein. Additionally, or alternatively, the blockchain ledger 114 can omit one or more of the systems, subsystems, and elements that are specifically shown and/or described herein. As provided in greater detail herein, the blockchain ledger 114 communicates with the host database 115 to perform the functions identified herein.

The host database 115 can send and receive any or all of the data within the financial services system 100. The host database 115 can integrate with one or more of the elements of the financial services system 100 and facilitates transactions within the system. The host database 115 can control, facilitate, and/or administrate all of the processes, functions, elements, and components within the financial services system 100. The host database 115 can achieve one or more functions of the financial services system 100.

The host database 115 can vary depending on the design requirements of the financial services system 100, the user device 102, the application 104, the digital wallet 106, and/or the blockchain 113. It is understood the host database 115 can include additional systems, subsystems, components, and elements than those specifically shown and/or described herein. Additionally, or alternatively, the host database 115 can omit one or more of the systems, subsystems, and elements that are specifically shown and/or described herein.

In the embodiment illustrated in FIG. 1, the host database 115 can include a host controller 117 and a non-transitory computer-readable medium 118. In certain embodiments, the host database 115 can include an encrypted partition (not shown) configured to store encrypted user data using a cryptographic key. Additionally, or in the alternative, the host database 115 can be connected to an encrypted tunnel (not shown) configured to protect and prevent unauthorized access to the financial services system.

The host controller 117 can control, facilitate, and/or administrate all of the processes, functions, elements, and components within the financial services system 100. The host controller 117 can achieve one or more functions of the financial services system 100. The host controller 117 can enable communication between the digital wallet 106 on the user device 102 and one of a local currency account and a digital currency account to initiate a deposit via one of the currency accounts 108.

The host controller 117 can assign a transaction ID that is recorded to the blockchain ledger 114, the transaction ID including a deposit currency value. The host controller 117 can assign a balance equal to the deposit currency value to one of the currency account 108 and the digital wallet 106, the balance being verified by the blockchain ledger 114. The host controller 117 can enable the withdrawal of at least a portion of the balance. The host controller 117 can send and store the deposit in the pool account 110.

The host controller 117 can dynamically determine the withdrawal amount in any of a plurality of currencies using a foreign exchange rate pricing algorithm on the non-transitory computer-readable medium 118. The host controller 117 can transfer the withdrawal amount to the digital wallet 106. The host controller 117 can update the blockchain ledger 114 to reflect the withdrawal amount. The host controller 117 can execute a balance transfer from a first digital wallet to a second digital wallet that is different than the first digital wallet. The host controller 117 can update the blockchain ledger 114 to reflect the balance transfer from the first digital wallet to the second digital wallet.

The host controller 117 can vary depending on the design requirements of the financial services system 100 and/or the host database 115. It is understood that the host controller 117 can include additional systems, subsystems, components, and elements than those specifically shown and/or described herein. Additionally, or alternatively, the host controller 117 can omit one or more of the systems, subsystems, and elements that are specifically shown and/or described herein. The host controller 117 can include any number of computer units, processors, systems, devices, and/or components necessary to perform the functions of the host database 115 and/or host controller 117 within the financial services system 100.

The non-transitory computer-readable medium 118 can store computer program instructions. The non-transitory computer-readable medium 118 can vary depending on the design requirements of the financial services system 100 and/or the host controller 117. It is understood that the non-transitory computer-readable medium 118 can include additional systems, subsystems, components, and elements than those specifically shown and/or described herein. Additionally, or alternatively, the non-transitory computer-readable medium 118 can omit one or more of the systems, subsystems, and elements that are specifically shown and/or described herein.

The non-transitory computer-readable medium 118 can be a tangible computer-readable carrier, such as a magnetic or optical memory or a magnetic or optical disk, as non-exclusive, non-limiting examples. The non-transitory computer-readable medium 118 can include any number of computer units, processors, systems, devices, and/or components necessary to perform the functions of the host database 115 and/or the host controller 117 within the financial services system 100.

A universal currency token 119 can be created by the financial services system 100 for use within the system. The universal currency token 119 can be used as a unit of an account that can be held in the user's digital wallet 106 until the funds are requested for withdrawal from the currency account 108 or the pool account 110. In some embodiments, the universal currency token 119 is only usable within the financial service system 100. In other words, in that embodiment, the universal currency token 119 is not publicly available or tradeable on an exchange. In various embodiments, the universal currency token 119 is available to the public.

The universal currency token 119 can be set to a single unit value of a currency (e.g., one U.S. Dollar, one euro, etc.) to become "universal" to said currency. For example, the universal currency token 119 can be set to the value of one U.S. dollar bill ($1) and backed by the funds deposited into the pool account 110. The representation of the price of the universal currency token 119 is synthetic to all other currencies (e.g., other than the set universal currency) and calculated based on local currency market rates. The actual cash value of the universal currency token 119 is determined at the time a user requests withdrawal. At the time of withdrawal, the universal currency tokens 118 can be essentially purchased back from the recipient using funds from the pool account 110.

The universal currency token 119 can vary depending on the design requirements of the financial services system 100. It is understood that the universal currency token 119 can include additional systems, subsystems, components, and elements than those specifically shown and/or described herein. Additionally, or alternatively, the universal currency token 119 can omit one or more of the systems, subsystems, and elements that are specifically shown and/or described herein. As provided in greater detail herein, the universal currency token 119 communicates with the host database 115 and/or the host controller 117 to perform the functions identified herein.

Partnered merchants receive additional functionality of the financial services system 100. Partnered merchants can receive credit card payments via the application 104 or through a QR code using a virtual point-of-sale system (e.g., without traditional point-of-sale hardware). Merchants can use the virtual point-of-sale system on any user device 102 via the application 104. Consumers of partnered merchants can scan QR codes to pay/tip and rate/review the partnered merchant. After the consumer has paid the partnered merchant, the consumer has the option to automatically leave a proportionate tip (e.g., 5%, 10%, 15%, or custom percentage) and to leave a memo for feedback for the partnered merchant. The application 104 can display the system convenience fee to the consumer upon checkout.

Back-end functionality to the partnered merchant can be included in the financial service system 100. The partnered merchant can distribute individual tips to employees and independent contractors. The timeline and amount of the tip can be determined at the discretion of the partnered merchant. Tips can be pooled into a group QR code. Partnered merchants can view ratings of individual employees and independent contractors that are left by consumers. The individual employees and independent contractors can be searched by the partnered merchant via a search function in the application 104 by the department for gratuities and feedback.

For partnered merchants in the travel and hospitality industry, the financial services system 100 enables individual employees and independent contractors to have custom IDs or QR codes that customers can scan in order to leave an individual gratuity to a specific individual employee or independent contractor via the application 104. Customers can also leave individual ratings and reviews for individual employees or independent contractors in the application 104. For example, in the absence of hard cash, customers can use the application 104 to send gratuity and leave ratings/reviews for individual parking attendants, valets, baggage skycaps, housekeepers, instructors, personal trainers, waiters, cooks, etc.

Merchants can be registered with the financial services system 100 using one or more of the following steps. In the application 104, the merchant can sign up via the user interface by selecting a business account. The merchant can add their business email address. The merchant can create personal login credentials. The merchant can give a description of their business. The merchant can enter the business address exactly as it appears on the business registration document or bank statement. The merchant can select a business type that best represents the merchant's organization. The merchant can input the formation and/or incorporation information. The merchant can select a nationality and input the date of birth. The merchant can enter a home address if it is different than the business address. The merchant can input information about the organization's gross incomes, assets, and agree to a certification statement. The merchant can add an e-mail address. The merchant can add a connected bank account. Limits on the amount of currency that can be transferred by the merchant can be adjusted in the application 104.

Loans can be offered using the financial services system 100 using one or more of the following steps. The purpose of the loan is entered into the system. The personal details of the customer can be entered into the system. Third-party application programming interfaces (APIs) can be called to select the optimal loan rate for the customer. The customer can be offered a microloan based on the customer's credit eligibility. After the customer is approved for the loan, the agent can select a payout method for the loan to the customer.

Bills and utilities can be paid using the financial services system 100 using one or more of the following steps. The customer can search for a user by making a search request to find the username or handle of the user. Third-party application programming interfaces (APIs) can be queried to the various bill providers. The customer can select the bill they wish to pay and the sum total amount for the customer to pay. The customer can select the payment method. The balance can be sent instantly if peer-to-peer or via a third-party application programming interface (API). The payment of the bill can be confirmed upon receiving a confirmed status from the system or a transaction ID from the third-party API.

Figure 2:
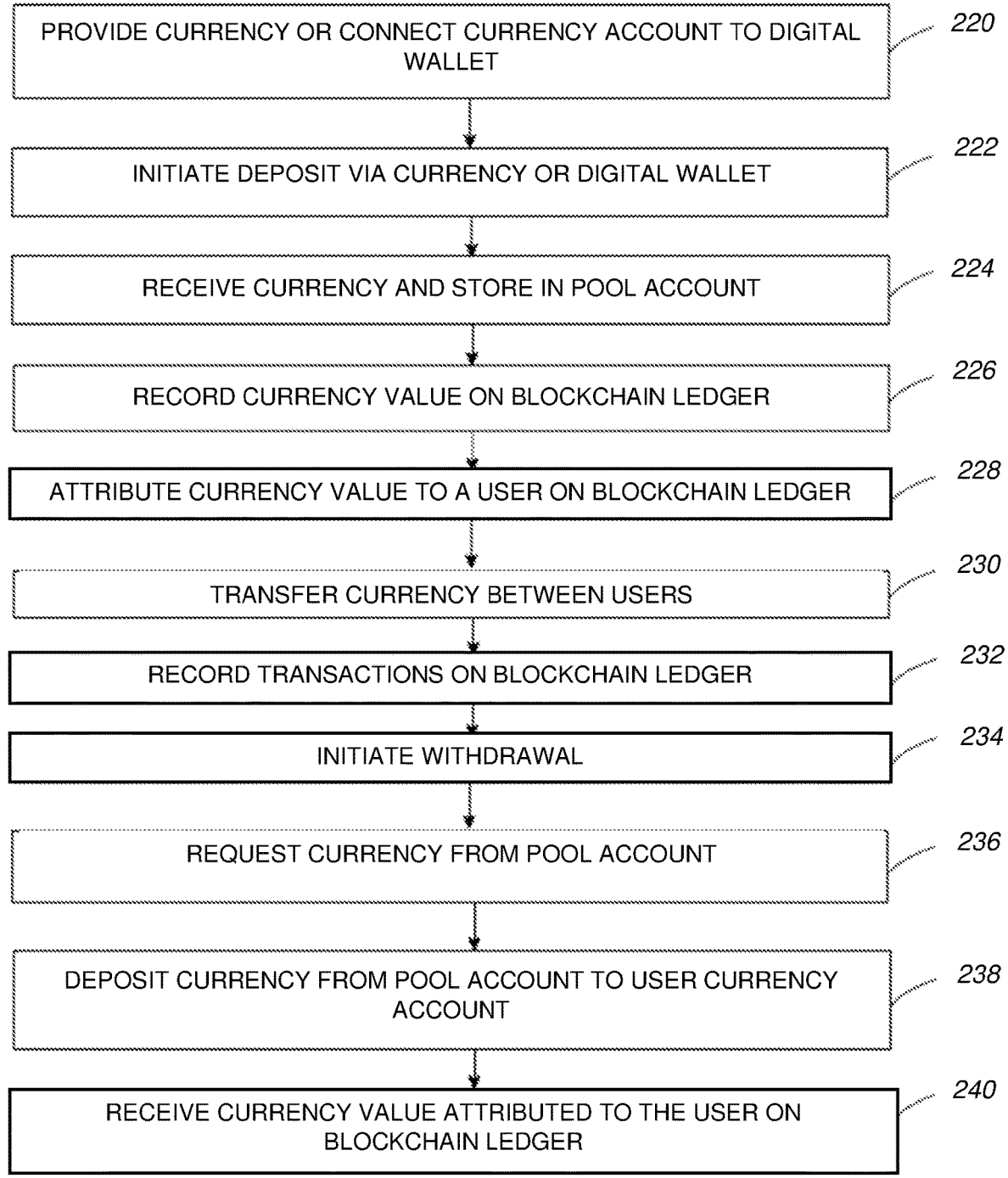
FIG. 2 is a flow chart depicting one embodiment of a method for transferring currency.

FIG. 2 is a flow chart depicting one embodiment of a method for transferring currency which can include one or more of the following steps. It is understood that the method can include additional steps than those specifically shown and/or described herein. Additionally, or alternatively, the method can omit one or more of the steps that are specifically shown and/or described herein. The method for transferring currency can be implemented on the financial service system 100, or other systems and subsystems not specifically shown and/or described herein. It is understood that the method shown and/or described herein can be controlled by the host controller 117 or other components of the host database 115. In other words, the method can be enabled by the financial services system 100 via the host controller 117.

At step 220, a sender (e.g., a user) connects or associates a currency account with a digital wallet. Alternatively, a sender can provide an agent with a cash or currency amount. The digital wallet can be connected to a currency account and configured to transfer funds to the pool account. The digital wallet can interact directly with the blockchain or via a blockchain interface. In various embodiments, the digital wallet can serve as an interface to a user. In that regard, the digital wallet can run on a user device as a thin web client, a hybrid app, or a native one.

At step 222, the sender can initiate a deposit through the digital wallet using the connected currency account or the cash funds. Alternatively, the agent can initiate a deposit on the user's behalf through the digital wallet using the connected currency account or the cash funds.

At step 224, the currency is received and stored in a pool account owned and operated by the financial services provider. The pool account can hold currencies including cash (domestic and foreign), digital currencies (cryptocurrency, digital account balances, etc.), notes, bonds, stocks, real property, and any other types of assets. The pool account works in cooperation with the digital wallet to receive funds from the digital wallet. Additionally, the pool account can issue currencies to users via executable smart contracts.

At step 226, the blockchain ledger records the cash value allocated to the user. The blockchain ledger can be based on the blockchain and thus have consensus-based transaction validation and immutability. When implemented in support of a financial services system, the blockchain ledger can serve as a ledger for transfers of funds, contracts, offers, and other suitable data retained in the blockchain.

At step 228, the user's digital wallet then reflects a balance equal to the value recorded on the blockchain ledger. The balance can be viewable on the digital wallet and/or user application.

At step 230, the user's available balance can be transferred to other users within the system. Peer-to-peer (P2P) payments can be made through the application. The application allows users to find other users and send currency to any user of the system.

At step 232, the blockchain ledger records the transfer transactions on the blockchain ledger, including values allocated to the parties involved. The updates are then reflected on each user's digital wallet balance. If the transfers include currency of differing types, the funds are priced based on current foreign exchange rates. The funds can be held either natively or synthetically within each user's digital wallet.

At step 234, the recipient of funds with an available balance can initiate a withdrawal. The withdrawal of funds can be via a connected bank account transfer, debit card atm withdrawal, or cash withdrawal from an agent. An agent can also withdraw a balance allocated to a new, unregistered user.

At step 236, successful redemption of funds triggers a request for withdrawal of currency from the pool account. The user can select the kind of currency to be withdrawn from the pool account, including digital currencies.

At step 238, the cash value is deposited to the recipient's connected currency account. Alternatively, the recipient can receive cash from the live agent and the agent receives the bank deposit from the pool account.

At step 240, the recipient receives the currency value attributed to the user on the blockchain ledger. The currency value should also be attributed to the user in the user's digital wallet.

Figure 3:
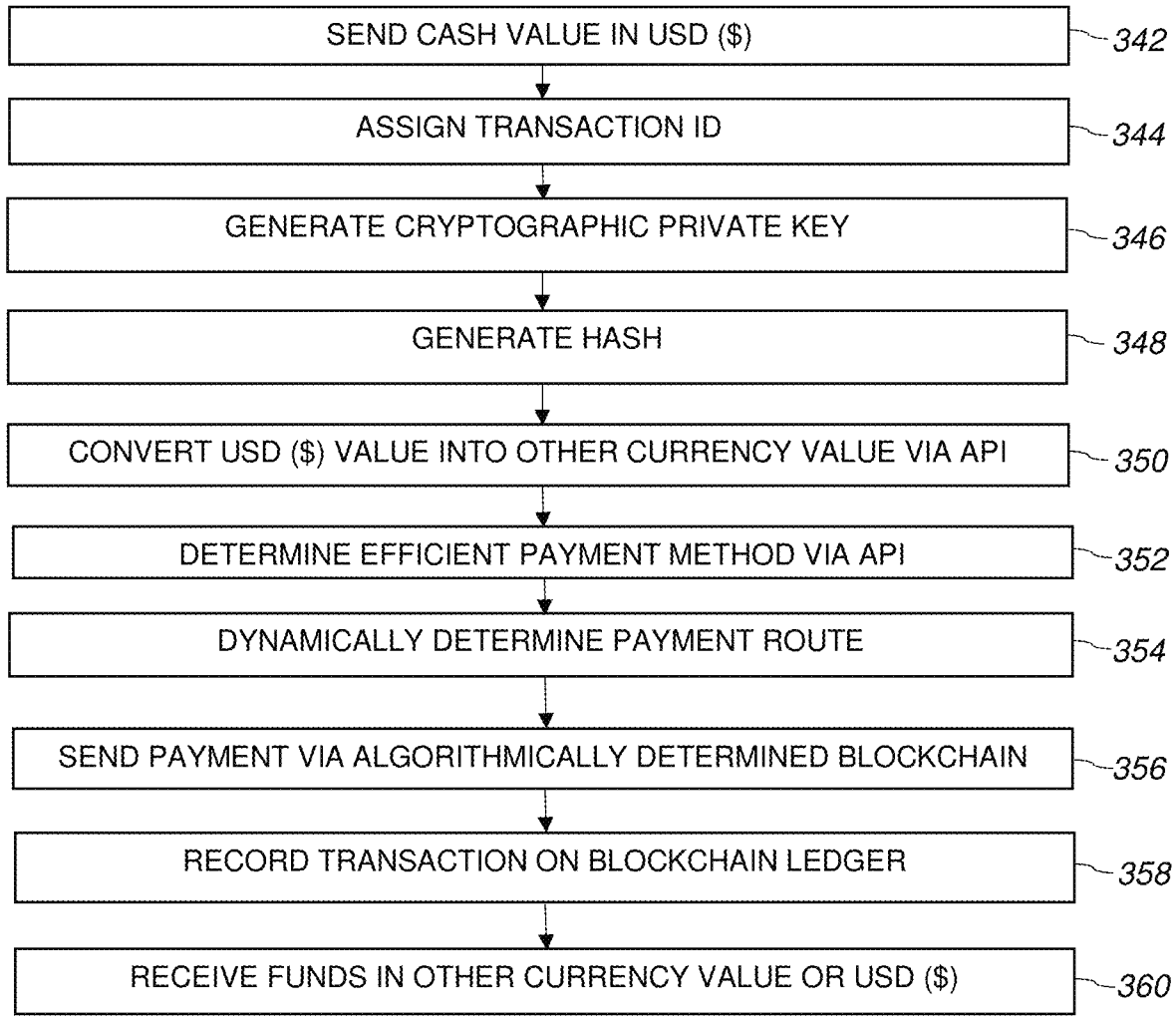
FIG. 3 is a flow chart depicting one embodiment of a method for encrypting transferred currency and optimizing transfers within a financial services system utilizing blockchain technology.

FIG. 3 is a flow chart depicting one embodiment of a method for encrypting transferred currency and optimizing transfers which can include one or more of the following steps. It is understood that the method can include additional steps than those specifically shown and/or described herein. Additionally, or alternatively, the method can omit one or more of the steps that are specifically shown and/or described herein. It is understood that the method shown and/or described herein can be controlled by the host controller 117 or other components of the host database 115. In other words, the method can be enabled by the financial services system 100 via the host controller 117.

At step 342, a user can send a cash deposit in U.S. dollars via the user's digital wallet by way of an instant settlement network. The system by utilizing the instant settlement network, can query the various integrated third-party rates in real-time and select the most cost-effective path based on an algorithm weighing additional factors such as delivery speed.

At step 344, a transaction ID is assigned to the deposit to be transferred within the instant settlement network. The transaction ID can be a randomly generated set of numbers.

At step 346, a cryptographic private key is generated and assigned to the transfer. The digital wallet can include an address and the private key associated with the digital wallet. The address and the private key can be generated by a user device and stored locally on the user device. The digital wallet can extract asymmetric private keys stored locally on the user device.

At step 348, a first data object is structured for hashing the private key and/or data. The digital wallet can prepare a blockchain request to interact with the blockchain. The digital wallet running on the user device can also sign the request to interact with the blockchain using the private key retrieved from local storage and applying an asymmetric encryption operation to the request. The first data object is then cryptographically hashed into a first hash and the first hash is inserted into a blockchain.

At step 350, the cash deposit in U.S. dollars is converted into another currency value via one or more application program interfaces (APIs). The system can include application programming interfaces (APIs) for converting currency value at certain exchange rates.

At step 352, the most efficient payment method is determined by one or one or more application program interfaces (APIs) calls against multiple payment providers and/or blockchains. The most efficient payment method can reduce settlement and delivery times to seconds rather than the days it takes for automated clearing house (ACH) transfers.

At step 354, the payment route is dynamically determined based on the proprietary weighted average of several metrics. The system queries the various third-party rates in real-time and determines the most cost-effective path based on an algorithm weighing additional factors such as delivery speed. The dynamic determination can also factor in different transfer channels such as a blockchain in addition to wire transfers or local transfer systems.

At step 356, the payment is sent via an algorithmically determined blockchain. Blockchains are queried based on various factors such as block mining times and transaction fee structures. The algorithmic determination takes these factors, among others, into consideration when determining which blockchain to use to send the payment.

At step 358, the transaction is recorded and can be reconciled against the blockchain ledger. The updates are then reflected on the user's digital wallet balance.

At step 360, the recipient can receive the funds in the converted currency value or U.S dollars. If the transfers include currency of differing types, the funds are priced based on current foreign exchange rates. The funds can be held either natively or synthetically within each user's digital wallet.

Figure 4:
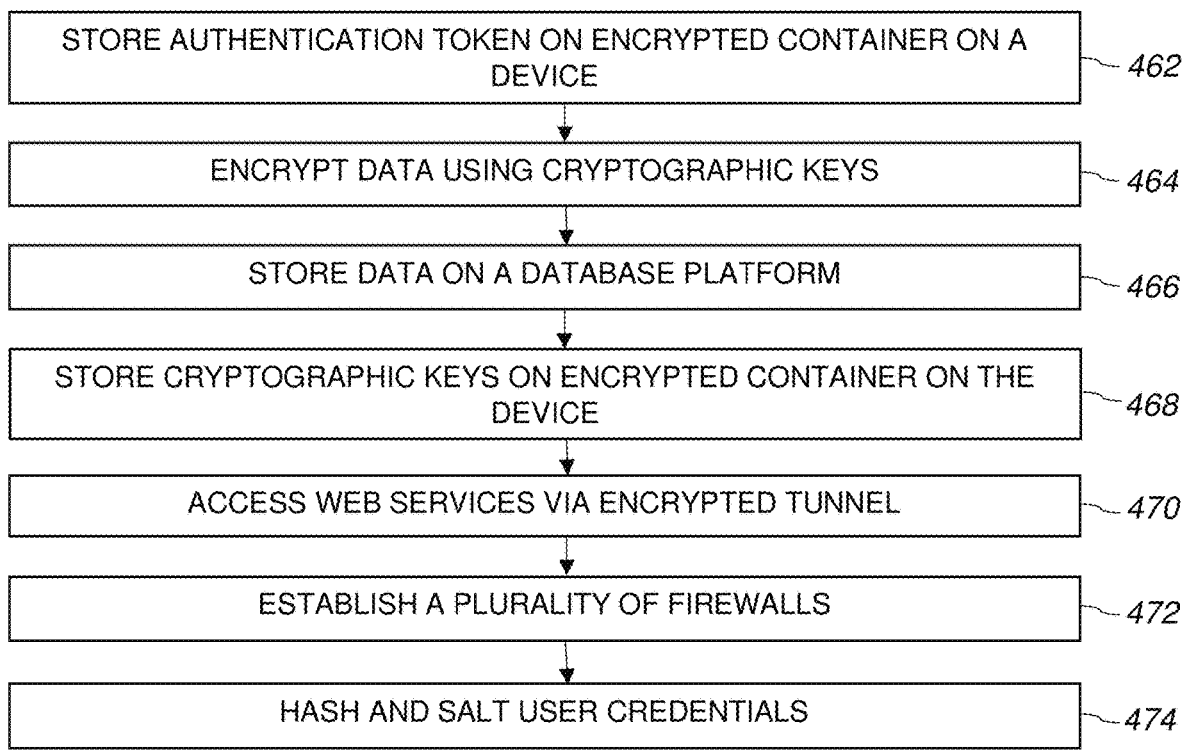
FIG. 4 is a flow chart depicting one embodiment of a method for securing and encrypting data within a financial services system utilizing blockchain technology.

FIG. 4 is a flow chart depicting one embodiment of a method for securing and encrypting data which can include one or more of the following steps. It is understood that the method can include additional steps than those specifically shown and/or described herein. Additionally, or alternatively, the method can omit one or more of the steps that are specifically shown and/or described herein. It is understood that the method shown and/or described herein can be controlled by the host controller 117 or other components of the host database 115. In other words, the method can be enabled by the financial services system 100 via the host controller 117.

At step 462, the authentication token is stored on an encrypted container on a user device. Sensitive user data can be stored on a backend web service. In some embodiments, the user data is never stored on the user device, eliminating the risk of divulging user data through an unsecured user device. QR codes can be used to reduce exposure of user card or account numbers. The application can notify users when their device is rooted and/or jailbroken.

At step 464, the data used within the system is encrypted using cryptographic keys. All information can be encrypted using the advanced encryption standard (AES)-256. The data is secured and encrypted on a cloud architecture of the system. In some embodiments, the system includes secured, serverless cloud architecture with Google Firebase™ products and services. The products and services can be certified by evaluation and certification processes, including but not limited to: iso 27001, soc 1, soc 2, soc 3, iso 27017, and iso 27018. Data in transit can be encrypted using HTTPS.

At step 466, the data used within the system is stored on an established PostgreSQL database platform, in a high availability configuration, with the option for georedundancy. The data is stored in compliance with current and future AML/CTL laws and are GDPR and CCPA compliant.

At step 468, the cryptographic keys used to encrypt user data are stored on an encrypted partition. The cryptographic keys can be digital asset private keys stored locally on the device and encrypted using BIP38. Private keys are not transmitted over the web.

At step 470, web services are accessed via an encrypted tunnel. The encrypted tunnel can use transport layer security (TLS) 1.3 or 1.2 between the servers and the web infrastructure and security provider. Web servers can run the Ubuntu server operating system and can be hardened according to the center for internet security (CIS) benchmarks. Payment rails and payment storage are PCI level 1 compliant.

At step 472, a plurality of firewalls is established. The servers can be behind up to a total of three firewalls on three different perimeters. The web infrastructure and service provider can provide a firewall, the data center can have a perimeter firewall, and the web servers can have a software firewall.

At step 474, user credentials are hashed and salted. User credentials are stored separately from the user's account profile and identity information. Passwords are one-way encrypted using hashing and salting. Passwords are required to be at least 12 characters long using a combination of upper-case letters, lower-case letters, and numbers. All user data is GDPR-, CCPA- and other data privacy acts compliant. In some embodiments, authentication services can use an internally modified version of Scrypt to hash account passwords.

Figure 5:
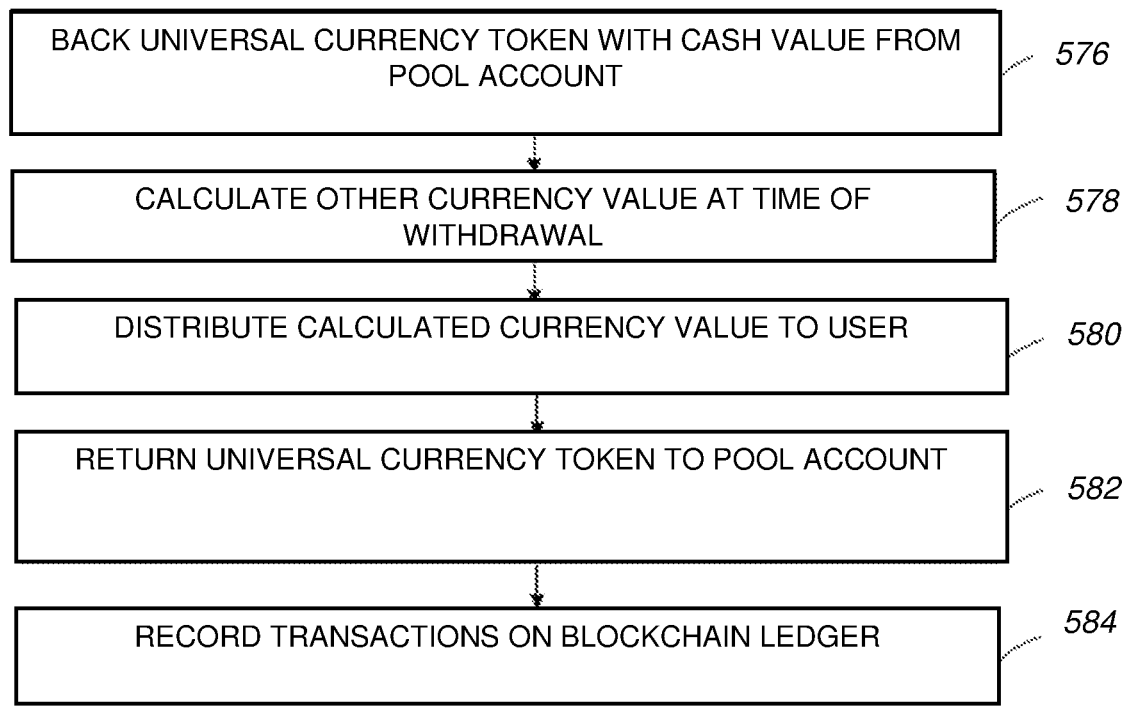
FIG. 5 is a flow chart depicting one embodiment of a method for creating a universal currency token for use within a financial services system utilizing blockchain technology.

FIG. 5 is a flow chart depicting one embodiment of a method for creating a universal currency token which can include one or more of the following steps. It is understood that the method can include additional steps than those specifically shown and/or described herein. Additionally, or alternatively, the method can omit one or more of the steps that are specifically shown and/or described herein. It is understood that the method shown and/or described herein can be controlled by the host controller 117 or other components of the host database 115. In other words, the method can be enabled by the financial services system 100 via the host controller 117.

At step 576, the universal currency token is backed with a cash value from the pool account. The universal currency token operates only within the financial services system and it is not a publicly available or exchange-traded token. The universal currency token is used as a unit of account that can be held in a user's digital wallet until funds are requested for withdrawal from the pool account. The universal currency token is set to a fixed value of exchange (i.e., $1) and backed by the funds deposited into the pool account. Representation of the universal currency token in other currency prices is synthetic and calculated based on foreign exchange rates.

The agent or sender can initiate a purchase order of the universal currency token through the digital wallet or a connected currency account. The pool account receives the funds used for the purchase order of the universal currency token. A functional call is made to the universal currency token smart contract after a successful purchase order is made. The newly generated universal smart token is issued to the sender or agent in the amount of the purchase order and delivered to the agent's or sender's digital wallet. The sender or agent can send the universal currency token to the recipient's digital wallet or a local agent acting on behalf of the recipient.

At step 578, the other currency value is calculated at the time of the withdrawal of the universal currency token. The other currency value is dynamically calculated by the withdrawal amount in a selected currency using a foreign exchange rate pricing algorithm.

At step 580, the calculated currency value is distributed to the user who requested the withdrawal. The recipient can determine the amount of currency to cash out. The funds can be sent to the local agent or sit in the recipient's digital wallet. The universal currency tokens in the amount of the calculated currency value are sent to the smart contract to redeem. The cash value is deposited to the recipient's connected bank account or the recipient receives the cash value from the live agent and the agent receives the bank deposit from the pool account.

At step 582, the universal currency token is returned to the pool account. In other words, the universal currency tokens are purchased back from the recipient by the pool account. Successful redemption from the smart contract triggers withdrawal of the calculated currency from the pool account to the recipient.

At step 584, the transaction is recorded and can be reconciled against the blockchain ledger.

Systems and methods are described herein for facilitating improved currency transfer via a fully integrated financial services system including a blockchain. For example, across the world money and financial service providers are running on expensive, dated systems, particularly in emerging markets. Due to this fact, users of these financial services often experience high fees to send, borrow, exchange, and process currency. However, by providing financial services on a hybrid blockchain system including updated mobile support, currency transfers can be faster, contactless, and work across multiple countries. These improved currency transfer systems can utilize mobile wallets and conventional bank accounts and the systems can be implemented by partner businesses. Benefits to the users of the improved currency transfer systems include lower rates (foreign currency exchange, loans, etc.), faster transfer speeds, reduced settlement times, mobile application access, elimination of wire transfers and bank-initiated transfers, and increased security. Using the systems and methods described herein, it can take around ten minutes to load funds into the system, funds can be transferred instantly from peer-to-peer. Funds can be withdrawn from the system to a bank within a day and it can take three to five days between the initial loading of funds and withdrawing of the funds from the system.

Conventional financial service systems using blockchain technology require a third party to provide connectivity between the blockchain and the financial service provider. To overcome the limitations of convention financial service systems, the systems and methods described herein implement an elastic payment and blockchain optimization engine, a mobile user interface that accommodates multiple currencies, countries, and languages, a dynamic back-end query layer to make requests to various service providers, and a plurality of third-party application program interfaces (APIs) to perform various tasks for financial service users. Thus, by using the systems and methods described here, global currency transfer is faster, simpler, peer-to-peer, and connected currencies are instantly usable with partnered, in-network businesses and merchants around the world.

Many conventional financial service providers are built on legacy systems and have limited interoperability with third parties. Many newer providers are exclusively providing regulated rails and back-end services. As a result, consumer-facing applications must be built and designed based on these regulated rails and back-end services.

The system described herein can include an elastic payment and blockchain optimization engine. The system includes custom server-side processes that connecting various application program interfaces (APIs), blockchains, exchanges, and banking rails to process queries of connected financial networks. The system is configured to embed transactional financial data directly into blockchain token transactions. This technical solution removes the computation burden from local machines, increases levels of security/encryption, and distributes data and storage resources to the blockchain, thereby improving the performance of the user devices within the system.

The elastic payment and blockchain optimization engine provide a solution to the limitations of the conventional finance service provide legacy systems. When utilized within an instant settlement network, the elastic payment and blockchain optimization engine allow peer-to-peer currency transfer which results in significantly lower rates for users, sometimes no fees. Peer-to-peer currency transfers within the systems and methods described herein occur instantly, regardless of whether the currency transfer is local or between two different countries.

By utilizing a blockchain and cryptography, currency transfers within the systems and methods disclosed herein are easier to audit because all transactions are recorded on an immutable ledger. When utilizing the elastic payment and blockchain optimization engine, payment routes are dynamically determined based on proprietary weighted averages, and payment is sent via an algorithmically determined blockchain.

Because transactions within the systems and methods disclosed herein can be cryptographically hashed and otherwise encrypted, the security and privacy of user data are increased. Additionally, system data can be stored on established PostgreSQL database platforms, in a high availability configuration, with the option for georedundancy. All system information is encrypted (cell-level encryption) using the industry's standard AES-256. The cryptographic keys used to encrypt the user data are stored on an encrypted partition. Web services are accessed through an encrypted tunnel between the servers and Cloudflare™. Servers can run the ubuntu server operating system, hardened according to the latest center for internet security benchmarks.

A payment network based on a blockchain, as described herein, can simplify peer-to-peer payment networks by using the blockchain as a ledger. The settlement process for payees can be near-instant. The solution can be easily integrated into eCommerce platforms. The payment network can also lead to lower discount fees for merchants as the overhead cost of maintaining the network can be reduced. Additionally, any user can pay any other user. Transparency is very high for various embodiments using a consortium or public blockchain since accounting is performed, for example, by a decentralized autonomous organization (DAO) instead of a specific financial institution.

In various embodiments, the system and method can include alerting a subscriber when their computer is offline. The system can include generating customized information and alerting a remote subscriber that the information can be accessed from their computer. The alerts are generated by filtering received information, building information alerts, and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method can comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method can include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface can comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a user device processor, to the unobscured portion of the first window in a second format during an overlap condition so that the entire scaled textual information is viewable on the computer screen by the user; and automatically returning the relocated scaled textual information, by the user device processor, to the first format within the first window when the overlap condition no longer exists.

In various embodiments, the system can also include isolating and removing malicious code from electronic messages (e.g., email) to prevent a computer from being compromised, for example by being infected with a computer virus. The system can scan electronic communications for malicious computer code and clean the electronic communication before it can initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database.

The presence of a particular malicious code-indicative pattern indicates the nature of the malicious code. The signature database further includes code markers that represent the beginning and endpoints of the malicious code. The malicious code is then extracted from malicious code-containing communication. An extraction routine is run by a file parsing component of the processing unit. The file parsing routine performs the following operations; scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased.

More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system can also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page.

The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third-party merchant affiliate. Because such composite pages are visually perceived by the customer as associated with the host web page, they give the customer the impression that she is viewing pages served by the host. Further, the customer is able to purchase the item without being redirected to the third-party merchant affiliate, thus allowing the host to retain control over the customer. This system enables the host to receive the same advertising revenue streams as before but without the loss of visitor traffic and potential customers. More particularly, the system can be useful in an outsource provider serving web pages offering commercial opportunities.

The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants, and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein can be implemented using the below particular machines, and those hereinafter developed, in any suitable combination, as would be appreciated immediately by one skilled in the art. Further, as is unambiguous from this disclosure, the methods described herein can result in various transformations of certain articles.

For the sake of brevity, conventional data networking, application development and other functional aspects of the systems (and components of the individual operating components of the systems) cannot be described in detail herein. Furthermore, the connecting lines shown in the various figures contained herein are intended to represent exemplary functional relationships and/or physical couplings between the various elements. It should be noted that many alternative or additional functional relationships or physical connections can be present in a practical system.

The various system components discussed herein can include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein can include: client data; merchant data; financial institution data; and/or like data useful in the operation of the system. As those skilled in the art will appreciate, user computer can include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof can be implemented using hardware, software or a combination thereof and can be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations can be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and can also include a secondary memory. The secondary memory can include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory can include other similar devices for allowing computer programs or other instructions to be loaded into computer system. Such devices can include, for example, a removable storage unit and an interface. Examples of such can include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals which can be electronic, electromagnetic, optical or other signals capable of being received by communications interface. These signals are provided to communications interface via a communications path (e.g., channel). This channel carries signals and can be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs can also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software can be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server can include application servers (e.g., WEB SPHERE, WEB LOGIC, JBOSS). In various embodiments, the server can include web servers (e.g., APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems can take the form of a computer or set of computers, although other types of computing units or systems can be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client can run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client can or cannot be in direct contact with an application server such as a digital wallet hub. For example, a web client can access the services of an application server through another server and/or hardware component, which can have a direct or indirect connection to an Internet server. For example, a web client can communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client can include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client can implement security protocols such as Secure Sockets Layer (SSL) and Transport Layer Security (TLS). A web client can implement several application layer protocols including http, https, ftp, and sftp.

In various embodiments, components, modules, and/or engines of the financial services system can be implemented as micro-applications or micro-apps. Micro-apps are typically deployed in the context of a mobile operating system, including for example, a WINDOWS® mobile operating system, an ANDROID® Operating System, APPLE® 10S®, a BLACKBERRY® operating system and the like. The micro-app can be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app can leverage the communication protocol of the operating system and associated device hardware under the predetermined rules of the mobile operating system. Moreover, where the micro-app desires an input from a user, the micro-app can be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing can include location-independent computing, whereby shared servers provide resources, software, and data to computers and other devices on demand.

As used herein, "transmit" can include sending electronic data from one system component to another over a network connection. Additionally, as used herein, "data" can include encompassing information such as commands, queries, files, data for storage, and the like in digital or any other form.

Any databases discussed herein can include relational, hierarchical, graphical, or object-oriented structure and/or any other database configurations. Common database products that can be used to implement the databases include DB2 by IBM® (Armonk, N.Y.), various database products available from ORACLE) Corporation (Redwood Shores, Calif.), MICROSOFT® Access® or MICROSOFT® SQL Server, by MICROSOFT® Corporation (Redmond, Wash.), MySQL by MySQL AB (Uppsala, Sweden), or any other suitable database product. Moreover, the databases can be organized in any suitable manner, for example, as data tables or lookup tables. Each record can be a single file, a series of files, a linked series of data fields or any other data structure. Association of certain data can be accomplished through any desired data association technique such as those known or practiced in the art. For example, the association can be accomplished either manually or automatically. Automatic association techniques can include, for example, a database search, a database merge, GREP, AGREP, SQL, using a key field in the tables to speed searches, sequential searches through all the tables and files, sorting records in the file according to a known order to simplify lookup, and/or the like. The association step can be accomplished by a database merge function, for example, using a "key field" in preselected databases or data sectors. Various database tuning steps are contemplated to optimize database performance. For example, frequently used files such as indexes can be placed on separate file systems to reduce In/Out ("I/O") bottlenecks.

More particularly, a "key field" partitions the database according to the high-level class of objects defined by the key field. For example, certain types of data can be designated as a key field in a plurality of related data tables and the data tables can then be linked on the basis of the type of data in the key field. The data corresponding to the key field in each of the linked data tables is preferably the same or of the same type. However, data tables having similar, though not identical, data in the key fields can also be linked by using AGREP, for example. In accordance with one embodiment, any suitable data storage technique can be utilized to store data without a standard format. Data sets can be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that can include fractal compression methods, image compression methods, etc.

One skilled in the art will also appreciate that, for security reasons, any databases, systems, devices, servers or other components of the system can consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein can be facilitated through a website having web pages. The term "web page" as it is used herein is not meant to limit the type of documents and applications that might be used to interact with the user. For example, a typical website might include, in addition to standard HTML documents, various forms, JAVA® APPLE®, JAVASCRIPT, active server pages (ASP), common gateway interface scripts (CGI), extensible markup language (XML), dynamic HTML, cascading style sheets (CSS), AJAX (Asynchronous JAVASCRIPT and XML), helper applications, plug-ins, and the like. A server can include a web service that receives a request from a web server, the request including a URL and an IP address (123.56.192.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL, and UDDI. Web services methods are well known in the art and are covered in many standard texts.

Practitioners will also appreciate that there are a number of methods for displaying data within a browser-based document. Data can be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, checkboxes, option boxes, and the like.

The system and method can be described herein in terms of functional block components, screenshots, optional selections, and various processing steps. It should be appreciated that such functional blocks can be realized by any number of hardware and/or software components configured to perform the specified functions. For example, the system can employ various integrated circuit components, e.g., memory elements, processing elements, logic elements, lookup tables, and the like, which can carry out a variety of functions under the control of one or more microprocessors or other control devices. Similarly, the software elements of the system can be implemented with any) programming or scripting language such as C, C++, C #, JAVA®, JAVASCRIPT, VBScript, Macromedia Cold Fusion, COBOL, MICROSOFT® Active Server Pages, assembly, PERL, PHP, awk, Python. Visual Basic, SQL Stored Procedures, PL/SQL, any UNIX shell script, and extensible markup language (XML) with the various algorithms being implemented with any combination of data structures, objects, processes, routines, or other programming elements. Further, it should be noted that the system can employ any number of conventional techniques for data transmission, signaling, data processing, network control, and the like. Still further, the system could be used to detect or prevent security issues with a client-side scripting language, such as JAVASCRIPT, VBScript, or the like.

The merchant computer and the bank computer can be interconnected via a second network, referred to as a payment network. The payment network which can be part of certain transactions represents existing proprietary networks that presently accommodate transactions for credit cards, debit cards, and other types of financial/banking cards. The payment network is a closed network that is assumed to be secure from eavesdroppers. Exemplary transaction networks can include the American Express®, VisaNet®, Veriphone®, Discover Card®, ApplePay®, GooglePay, private networks (e.g., department store networks), and/or any other payment networks.

These computer program instructions can be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions can also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof can make reference to user WINDOWS®, webpages, websites, web forms, prompts, etc. Practitioners will appreciate that the illustrated steps described herein can comprise any number of configurations including the use of WINDOWS®, webpages, web forms, popup WINDOWS®, prompts, and the like. It should be further appreciated that the multiple steps as illustrated and described can be combined into single webpages and/or WINDOWS® but have been expanded for the sake of simplicity. In other cases, steps illustrated and described as single process steps can be separated into multiple webpages and/or WINDOWS® but have been combined for simplicity.

Phrases and terms similar to "currency account" can include any account that can be used to facilitate a financial transaction. Phrases and terms similar to "financial institution" or "account issuer" can include any entity that offers transaction account services. Although often referred to as a "financial institution," the financial institution can represent any type of bank, lender, or other types of account-issuing institutions, such as credit card companies, card sponsoring companies, or third-party issuers under contract with financial institutions. It is further noted that other participants can be involved in some phases of the transaction, such as an intermediary settlement institution.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems and any elements that can cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone can be present in an embodiment, B alone can be present in an embodiment, C alone can be present in an embodiment, or that any combination of the elements A, B, and C can be present in a single embodiment; for example, A and B, A and C, B and C, or A and B and C.

Although the disclosure includes a method, it is contemplated that it can be embodied as computer program instructions on a tangible computer-readable carrier, such as a magnetic or optical memory or a magnetic or optical disk. All structural, chemical and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but can include other elements not expressly listed or inherent to such process, method, article, or apparatus.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications can be made while remaining within the spirit and scope herein.

It is understood that although a number of different embodiments of the systems and methods have been illustrated and described herein, one or more features of any one embodiment can be combined with one or more features of one or more of the other embodiments, provided that such combination satisfies the intent of the present invention.

While a number of exemplary aspects and embodiments of the systems and methods have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope, and no limitations are intended to the details of construction or design herein shown.

What is claimed is:

1. A financial services system that transfers currency comprising a user device and a blockchain that increases transfer speeds, reduces settlement times, and improves security, the blockchain having a blockchain ledger, the financial services system further comprising:
a host database including a non-transitory computer-readable medium including code and a host controller that executes the code, the host controller enabling communication between a first digital wallet on the user device and one of a local currency account and a digital currency account that initiates a deposit via one of the currency accounts, the deposit being assigned a transaction ID that is recorded to the blockchain ledger, the transaction ID including a deposit currency value, the host controller being configured to send and store the deposit in a pool account, the host controller being configured to assign a balance equal to the deposit currency value to one of the currency account and the first digital wallet, the balance being verified by the based on one or more of (i) payment delivery speed, (ii) available transfer channels, (iii) block mining times, and (iv) transaction fee structures, wherein the host controller is configured to enable withdrawal of at least a portion of the balance, the host controller being configured to embed transactional financial data directly into the blockchain, reducing a computation burden on the host controller, increasing security of the transactional financial data, improving encryption of the transactional financial data, and improving performance of the user device and the host controller; and wherein the host database includes (i) an encrypted partition configured to store encrypted user data with a cryptographic key, and (ii) an encrypted tunnel configured to protect and prevent unauthorized access to the financial services system such that data within the host database is encrypted with asymmetric encryption that signs and verifies signatures for blockchain cryptography operations.

2. The financial services system of claim 1 wherein the host controller is configured to enable a withdrawal of a withdrawal amount equal to at least a portion of the balance from the pool account.

3. The financial services system of claim 2 wherein the host controller is configured to dynamically determine the withdrawal amount in any of a plurality of currencies with a foreign exchange rate pricing algorithm on the non-transitory computer-readable medium.

4. The financial services system of claim 2 wherein the host controller is configured to transfer the withdrawal amount to the first digital wallet.

5. The financial services system of claim 2 wherein the host controller is configured to update the blockchain ledger to reflect the withdrawal amount.

6. The financial services system of claim 1 wherein the host controller is configured to execute a balance transfer from the first digital wallet to a second digital wallet that is different than the first digital wallet.

7. The financial services system of claim 6 wherein the host controller is configured to update the blockchain ledger that reflects the balance transfer from the first digital wallet to the second digital wallet.

8. The financial services system of claim 1 wherein data within the host database is encrypted with a 256-bit Advanced Encryption Standard.

9. The financial services system of claim 1 wherein the encrypted tunnel uses transport layer security between at least one of (i) servers, (ii) web infrastructure, and (ii) security provider.

10. A financial services system for transferring currency utilizing a user device and a blockchain to enable increased transfer speeds, reduced settlement times, and improved security, the blockchain having a blockchain ledger, the financial services system comprising:
a host database including a non-transitory computer-readable medium including code and a host controller that executes the code, the host controller enabling communication between a first digital wallet on the user device and one of a local currency account and a digital currency account to initiate a deposit via one of the currency accounts, the deposit being assigned a transaction ID that is recorded to the blockchain ledger, the transaction ID including a deposit currency value, the host controller being configured to send and store the deposit in a pool account, the host controller being configured to assign a balance equal to the deposit currency value to one of the currency account and the first digital wallet, the balance being verified by the blockchain ledger, the host controller being configured to enable the blockchain to autonomously manage one or more workflows associated with payment processing, reducing a processing load on the host controller, the host controller being configured to dynamically determine one or more payment routes based on one or more of (i) payment delivery speed, (ii) available transfer channels, (iii) block mining times, and (iv) transaction fee structures, the host database includes an encrypted partition configured to store encrypted user data using a cryptographic key, and an encrypted tunnel configured to protect and prevent unauthorized access to the financial services system, wherein data within the host database is encrypted with asymmetric encryption that signs and verifies signatures for blockchain cryptography operations.

11. The financial services system of claim 10 wherein the host controller is configured to enable a withdrawal of a withdrawal amount equal to at least a portion of the balance from the pool account.

12. The financial services system of claim 11 wherein the host controller is configured to dynamically determine the withdrawal amount in any of a plurality of currencies using a foreign exchange rate pricing algorithm on the non-transitory computer-readable medium.

13. The financial services system of claim 11 wherein the host controller is configured to transfer the withdrawal amount to the first digital wallet.

14. The financial services system of claim 11 wherein the host controller is configured to update the blockchain ledger to reflect the withdrawal amount.

15. The financial services system of claim 10 wherein the host controller is configured to execute a balance transfer from the first digital wallet to a second digital wallet that is different than the first digital wallet.

16. The financial services system of claim 15 wherein the host controller is configured to update the blockchain ledger to reflect the balance transfer from the first digital wallet to the second digital wallet.

17. The financial services system of claim 10 wherein data within the host database is encrypted using a 256-bit Advanced Encryption Standard.

18. A financial services system for transferring currency utilizing a user device and a blockchain to enable increased transfer speeds, reduced settlement times, and improved security, the blockchain having a blockchain ledger, the financial services system comprising:
- a host database including a non-transitory computer-readable medium including code and a host controller that executes the code, the host controller enabling communication between a first digital wallet on the user device and one of a local currency account and a digital currency account to initiate a deposit via one of the currency accounts, the deposit being assigned a transaction ID that is recorded to the blockchain ledger, the transaction ID including a deposit currency value, the host controller being configured to send and store the deposit in a pool account, the host controller being configured to assign a balance equal to the deposit currency value to one of the currency account and the first digital wallet, the balance being verified by the blockchain ledger, the host controller being configured to enable the blockchain to autonomously manage one or more workflows associated with payment processing, reducing a processing load on the host controller, the host controller being configured to dynamically determine one or more payment routes based on one or more of (i) payment delivery speed, (ii) available transfer channels, (iii) block mining times, and (iv) transaction fee structures, the host database including an encrypted partition configured to store encrypted user data using a cryptographic key, and an encrypted tunnel configured to protect and prevent unauthorized access to the financial services system, wherein data within the host database is encrypted with asymmetric encryption that signs and verifies signatures for blockchain cryptography operations, wherein the encrypted tunnel uses transport layer security between at least one of servers, web infrastructure, and a security provider.

* * * * *